US012596041B2

(12) United States Patent
Ichikawa et al.

(10) Patent No.: US 12,596,041 B2
(45) Date of Patent: Apr. 7, 2026

(54) VEHICLE PERFORMANCE TEST DEVICE

(71) Applicant: Honda Motor Co., Ltd., Tokyo (JP)

(72) Inventors: Yosuke Ichikawa, Tokyo (JP); Sumio Noguchi, Tokyo (JP); Yoshito Otake, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 286 days.

(21) Appl. No.: 18/407,364

(22) Filed: Jan. 8, 2024

(65) Prior Publication Data

US 2024/0255370 A1 Aug. 1, 2024

(30) Foreign Application Priority Data

Feb. 1, 2023 (CN) .......................... 202310049451.3

(51) Int. Cl.
G01L 5/28 (2006.01)
B60T 17/22 (2006.01)

(52) U.S. Cl.
CPC .............. G01L 5/282 (2013.01); B60T 17/22 (2013.01)

(58) Field of Classification Search
None
See application file for complete search history.

(56) References Cited

U.S. PATENT DOCUMENTS

| | | | | |
|---|---|---|---|---|
| 3,967,017 | A | * | 6/1976 | Marten ..................... C23C 4/02 |
| | | | | 427/427 |
| 6,561,013 | B1 | * | 5/2003 | Leep ................. G01M 17/0074 |
| | | | | 73/116.08 |

FOREIGN PATENT DOCUMENTS

| | | | | |
|---|---|---|---|---|
| JP | H05231993 | | | 9/1993 |
| JP | 08122215 | A | * | 5/1996 |
| JP | 3107363 | U | * | 2/2005 |
| JP | 3107364 | U | * | 2/2005 |
| JP | 2015075344 | A | * | 4/2015 |

* cited by examiner

*Primary Examiner* — Daniel S Larkin
(74) *Attorney, Agent, or Firm* — JCIPRNET

(57) ABSTRACT

The disclosure provides a vehicle performance test device, capable of facilitating the wear resistance of a rear roller and thereby reducing testing cost. A vehicle performance test device according to an embodiment includes: a test bed, configured to support a vehicle; and a front roller and a rear roller, disposed in pair on the test bed and spaced apart in a vehicle front-rear direction to support a wheel of the vehicle. The wheel of the vehicle is placed between the front roller and the rear roller to test braking performance of the vehicle. An electrodeposition particle layer is formed on a surface of the rear roller by electrodepositing rigid particles on a metal plating layer.

4 Claims, 4 Drawing Sheets

100

VEHICLE PERFORMANCE TEST DEVICE

CROSS-REFERENCE TO RELATED APPLICATION

This application claims the priority benefit of China application Ser. No. 202310049451.3, filed on Feb. 1, 2023. The entirety of the above-mentioned patent application is hereby incorporated by reference herein and made a part of this specification.

BACKGROUND

Technical Field

The disclosure relates to a vehicle performance test device.

Description of Related Art

In recent years, to ensure access to affordable reliable sustainable and modern energy for more people, efforts have been made in research and development on energy efficiency improvement, which contributes to energy efficiency. Meanwhile, for the techniques of facilitating energy efficiency, the testing on vehicle performance has been an issue.

For example, during a test process on a vehicle, when the vehicle is tested by using a vehicle performance test device, functions, such as braking performance, of the vehicle may be tested by arranging the vehicle to travel on rollers of the vehicle performance test device through the driver's operation. For example, in the vehicle performance test device, the wheels are supported by paired rollers. The paired rollers rotate in the same direction (e.g., the rear direction of the vehicle), and the driver performs a braking operation on the vehicle. At this time, due to the rotation of the rollers in the rear direction of the vehicle, the vehicle is elevated rearward (that is, the wheel may leave the front roller, which creates a gap). Accordingly, the braking performance of the vehicle is tested. Thus, the friction between the rear roller and the wheels is important in the test of braking performance, and the friction and wear resistance of the rear roller have become issues. In the conventional vehicle performance test device, there have been techniques of facilitating wear resistance by providing a thermal spray layer on the surface of a roller. However, through the use of the vehicle performance test device, the thermal spray layer on the surface of the roller may be peeled off due to friction, leading to deterioration of wear resistance (particularly in the rear roller in a pair of rollers). Therefore, the roller needs to be repetitively subjected to a thermal spray process or be replaced. As a result, the testing cost is increased.

The disclosure provides a vehicle performance test device capable of facilitating the wear resistance of the rear roller, thereby reducing the testing cost. In addition, energy efficiency is thus facilitated.

PRIOR ART DOCUMENT(S)

Patent Document(s)

[Patent Document 1] Japanese Laid-open No. H05-231993.

SUMMARY

An aspect of the disclosure provides a vehicle performance test device, including: a test bed, configured to support a vehicle; and a front roller and a rear roller, disposed in pair on the test bed and spaced apart in a vehicle front-rear direction to support a wheel of the vehicle. The wheel of the vehicle is placed between the front roller and the rear roller to test braking performance of the vehicle. An electrodeposition particle layer is formed on a surface of the rear roller by electrodepositing rigid particles on a metal plating layer.

To make the above features and advantages of the present invention more comprehensible, several embodiments accompanied with drawings are described in detail as follows.

DESCRIPTION OF THE EMBODIMENTS

The disclosure provides a vehicle performance test device, capable of facilitating the wear resistance of a rear roller and thereby reducing testing cost.

An aspect of the disclosure provides a vehicle performance test device, including: a test bed, configured to support a vehicle; and a front roller and a rear roller, disposed in pair on the test bed and spaced apart in a vehicle front-rear direction to support a wheel of the vehicle. The wheel of the vehicle is placed between the front roller and the rear roller to test braking performance of the vehicle. An electrodeposition particle layer is formed on a surface of the rear roller by electrodepositing rigid particles on a metal plating layer.

According to an embodiment of the disclosure, the electrodeposition particle layer is configured to expose at least a portion of the rigid particles from a surface.

According to an embodiment of the disclosure, the electrodeposition particle layer is not formed on a surface of the front roller.

Based on the above, in the vehicle performance test device according to the disclosure, the front roller and the rear roller are disposed in pair on the test bed and spaced apart in the vehicle front-rear direction to support the wheel of the vehicle. The wheel of the vehicle is placed between the front roller and the rear roller to test the braking performance of the vehicle. In addition, the electrodeposition particle layer is formed on the surface of the rear roller by electrodepositing rigid particles on the metal plating layer. In this way, wear resistance is facilitated by forming the electrodeposition particle layer on the surface of the rear roller. As the electrodeposition particle layer is hardly peeled off from the surface of the rear roller, it is not required to repetitively perform a wear resistance process on the rear roller or replace the rear roller. Thus, the testing cost can be reduced. Thus, in the vehicle performance test device according to the disclosure, the rear resistance of the rear roller can be facilitated. As a result, the testing cost is reduced.

Figure 1:
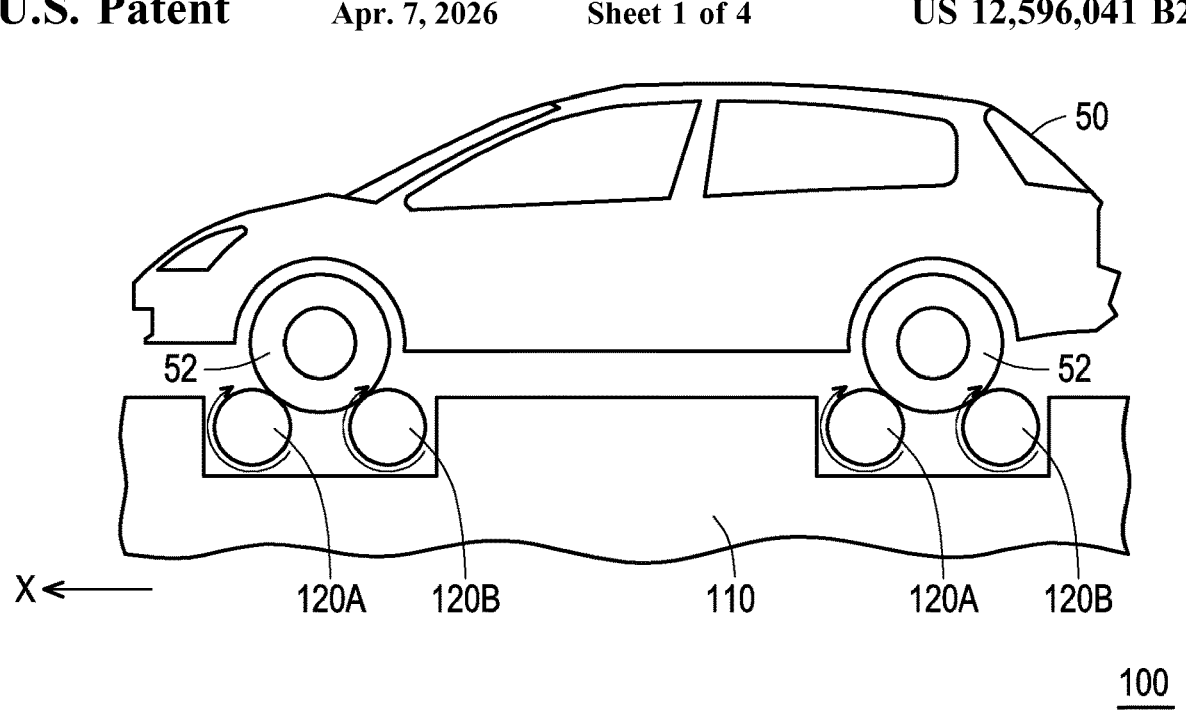
FIG. 1 is a schematic view illustrating a vehicle performance test device according to an embodiment of the disclosure when testing a vehicle.
Figure 2:
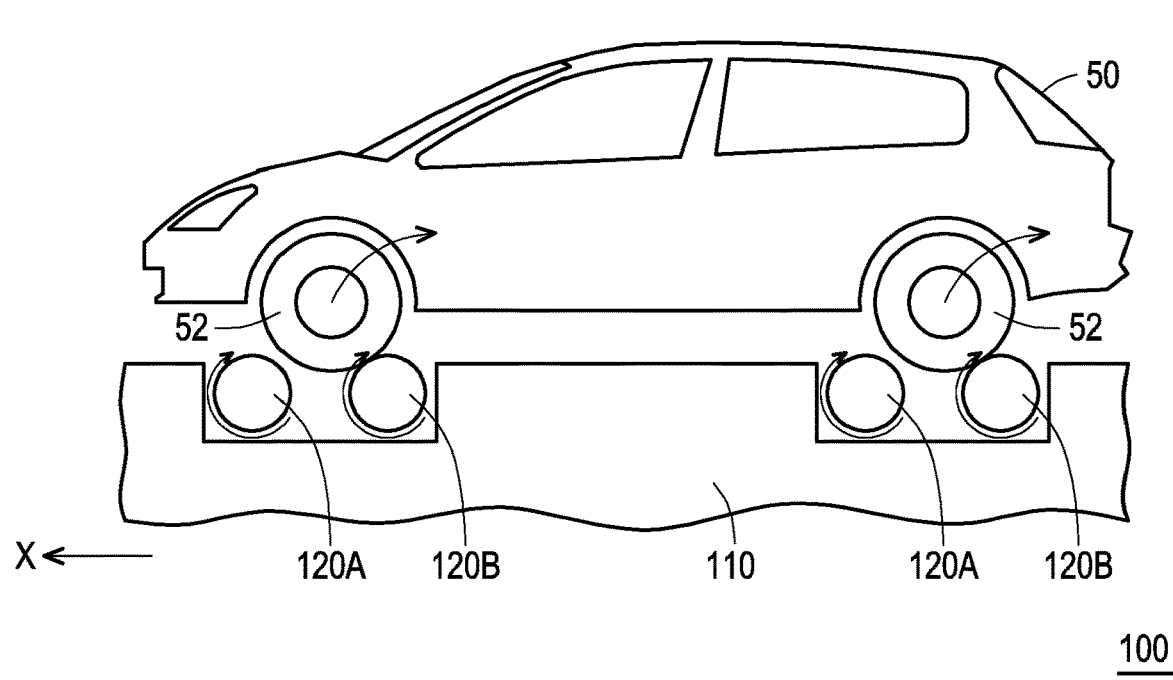
FIG. 2 is a schematic view illustrating a state of the vehicle performance test device shown in FIG. 1 during a test process.
Figure 3:
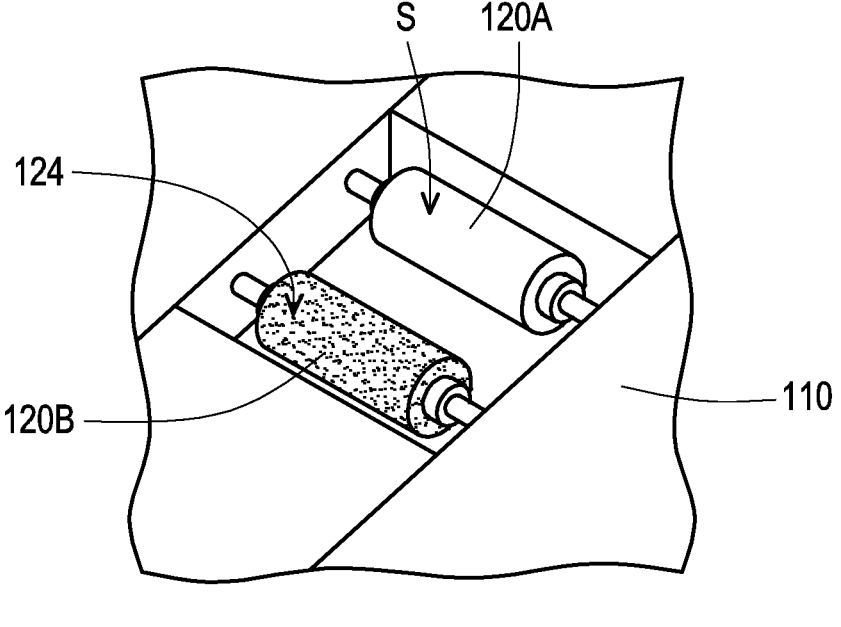
FIG. 3 is a schematic view illustrating a configuration of a portion of the vehicle performance test device shown in FIG. 1.

Descriptions of the disclosure are given with reference to the exemplary embodiments illustrated with accompanied drawings, where same or similar parts are denoted with same reference numerals. FIG. 1 is a schematic view illustrating a vehicle performance test device according to an embodiment of the disclosure when testing a vehicle. FIG. 2 is a schematic view illustrating a state of the vehicle performance test device shown in FIG. 1 during a test process. FIG. 3 is a schematic view illustrating a configuration of a portion of the vehicle performance test device shown in FIG. 1. FIGS. 4A to 4D are schematic views illustrating processes of forming an electrodeposition particle layer on a surface of a rear roller used in the vehicle performance test device shown in FIG. 1. In the following, a specific configuration and processes for manufacturing a vehicle performance test device 100 according to the embodiment are described with reference to FIGS. 1 and 4D. However, the description only serves as an example, and the disclosure shall not be construed as being limited thereto.

Referring to FIG. 1, in the embodiment, the vehicle performance test device 100 tests a vehicle 50. The vehicle performance test device 100 includes a test bed 110, a front roller 120A, and a rear roller 120B. The test bed 110 is configured to support the vehicle 50. For example, a driver (not shown) may drive the vehicle 50 onto the test bed 110. The front roller 120A and the rear roller 120B are disposed in pair on the test bed 110 and spaced apart in a vehicle front-rear direction X to support the front end and the rear end of a wheel 52 of the vehicle 50. The wheel 52 of the vehicle 50 is placed between the front roller 120A and the rear roller 120B to test the braking performance of the vehicle 50. For example, when a four-wheel vehicle serving as the vehicle 50 is under test, four pairs of the front rollers 120A and the rear rollers 120B are provided on the test bed 110 of the vehicle performance test device 110 to respectively cope with the four wheels 52 of the vehicle 50. In FIG. 1, two pairs of the front rollers 120A and the rear rollers 120B and two wheels 52 are shown in FIG. 1. However, the disclosure does not intend to impose a limitation on the numbers of the front rollers 120A and the rear rollers 120B provided in the vehicle performance test device 100, and such numbers may be adjusted based on needs.

Specifically, as shown in FIG. 1, during the test process on the vehicle 50, when the vehicle 50 is tested by using the vehicle performance test device 100, functions, such as the braking performance of the vehicle 50, are tested by arranging the vehicle 50 to travel on the front rollers 120A and the rear rollers 120B of the vehicle performance test device 100. For example, in the vehicle performance test device 100, the wheel 52 is supported by the front roller 120A and the rear roller 120B in pair. The front roller 120A and the rear roller 120B in pair rotate in the same direction (e.g., the rear direction of the vehicle), and the driver performs a braking operation on the vehicle 50. At this time, as shown in FIG. 2, due to the rotation of the front roller 120A and the rear roller 120B in the rear direction of the vehicle, the vehicle 50 is elevated rearward. That is, the wheel 52 may leave the front roller 120A, which creates a gap. Accordingly, the braking performance of the vehicle 50 is tested. In this way, the friction between the rear roller 120B and the wheel 52 is important in the test of braking performance, and the friction and wear resistance of the rear roller 120B have become issues.

Accordingly, in the vehicle performance test device 100 according to the embodiment, as shown in FIGS. 3 and 4A to 4D, an electrodeposition particle layer 124 is formed on a surface S of the rear roller 120B by electrodepositing rigid particles P on a metal plating layer 122. Electrodeposition refers to a process of fixing the rigid particles P on the metal plating layer 122 while performing a plating process, and the rigid particles P deposited on the metal plating layer 122 form the electrodeposition particle layer 124. The processes of forming the electrodeposition particle layer 124 on the surface S of the rear roller 120B used in the vehicle performance test device 100 are as shown in FIGS. 4A to 4D.

Figure 4A:
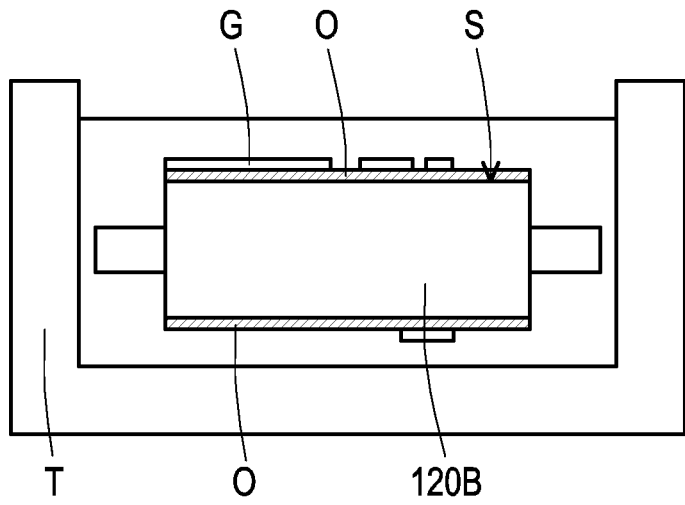
FIGS. 4A to 4D are schematic views illustrating processes of forming an electrodeposition particle layer on a surface of a rear roller used in the vehicle performance test device shown in FIG. 1.
Figure 4B:
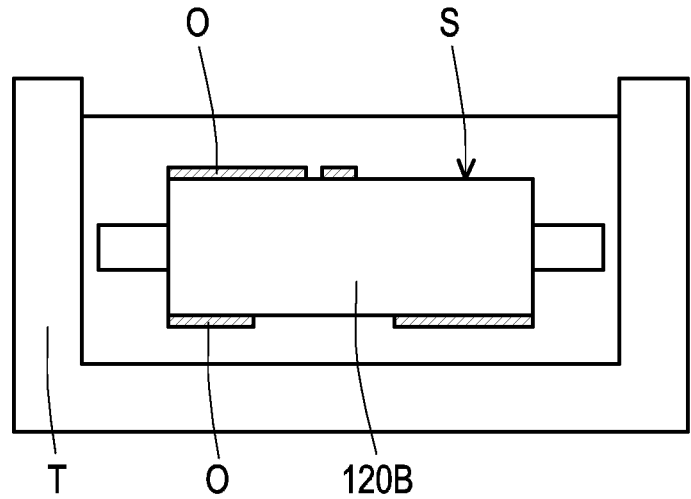
Figure 4C:
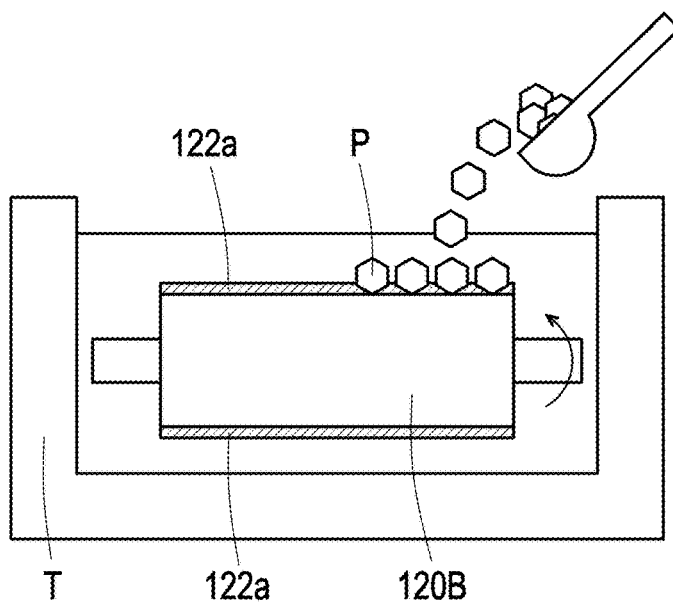
Figure 4D:
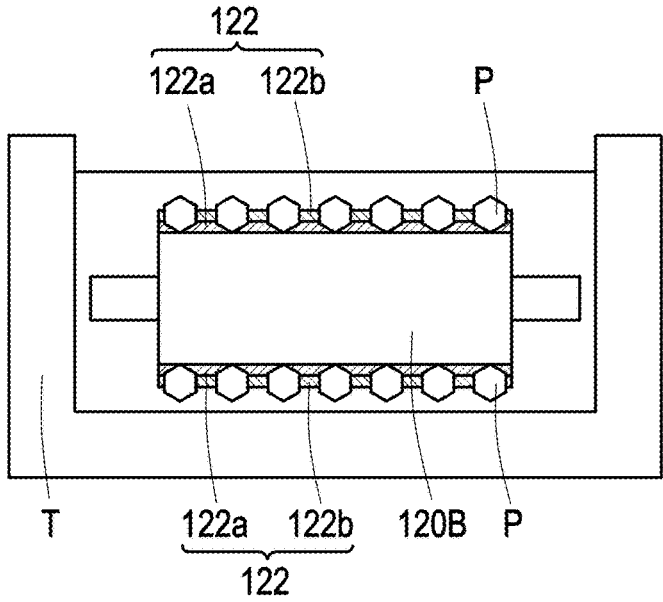

Firstly, as shown in FIG. 4A, in a cleaning process, an oil film G and dust, etc., attached to the surface S of the rear roller 120B during a machining process are removed by performing an alkaline degreasing process in a specialized tank T. Then, as shown in FIG. 4B, in an oxide film removing process, an oxide film O on the surface S of the rear roller 120B is removed by performing pickling using an acid solution in the specialized tank T. Then, as shown in FIG. 4C, in an electroplating process, a metal plating layer 122a is formed on the surface S of the rear roller 120B, and the rigid particles P are deposited on the metal plating layer 122a while rotating the rear roller 120B. The electrodeposition particle layer 124 may be formed on the entire surface S of the rear roller 120B to facilitate the friction and wear resistance of the entire surface S. Therefore, in this process, at the same time when forming the metal plating layer 122a, the rigid particles P are evenly deposited on the entire surface S of the rear roller 120B by rotating the rear roller 120B. In this way, the rigid particles P are temporarily fixed to the metal plating layer 122a through electroplating. Then, as shown in FIG. 4D, in an electroless plating process, another metal plating layer 122b is formed, so that the rigid particles P are further fixed to the metal plating layer 122b. Accordingly, the electrodeposition particle layer 124 is formed. The electrodeposition particle layer 124 is formed so that at least a portion of the rigid particles P are exposed from the surface S. That is, the metal plating layer 122b is able to reinforce the fixture of the rigid particles P, but does not completely cover the rigid particles P, so as to ensure the friction of the electrodeposition particle layer 124.

Thus, in the embodiment, the electrodeposition particle layer 124 is formed on the surface S of the rear roller 120B by electrodepositing the rigid particles P on the metal plating layer 122. By doing so, a friction substantially equivalent to that attained through conventional thermal spraying can be attained, whereas the wear resistance is facilitated (by about five times of the thermal spraying technique). The electrodeposition particle layer 124 is hardly peeled off from the surface S of the rear roller 120B. Thus, it is not required to repetitively perform a wear resistance process on the rear roller 120B or replace the rear roller 120B, and consequently the testing cost is reduced. Accordingly, with the vehicle performance test device 100, the wear resistance of the rear roller 120B can be facilitated to reduce the testing cost. The metal plating layer 122 may be a nickel plating layer, for example, and the rigid particles P may be a rigid material, such as cubic boron nitride (CBN), adamas, for example. However, the disclosure is not limited thereto. In addition, the processes shown in FIGS. 4A to 4D merely serve as an example. The disclosure does not intend to limit the details of forming the electrodeposition particle layer 124 on the surface S of the rear roller 120B, and such details may be modified as needed.

In addition, in the embodiment, after the rear roller 120B in which the electrodeposition particle layer 124 is formed on the surface S is retrieved from the specialized tank T and subjected to relevant post-processing (the disclosure does not intend to limit whether post-processing is performed), the rear roller 120B may be installed to the test bed 110 as shown in FIG. 3, and the electrodeposition particle layer 124 may form a contact surface with the wheel 52 during the test process. It is noted that, as shown in FIG. 3, it may be that the electrodeposition particle layer 124 is not formed on the surface S of the front roller 120A. That is, unlike the rear roller 120B, the front roller 120A is not required to exhibit a higher wear resistance, and may be subjected to a conventional wear resistance process only (the disclosure does not intend to limit the type of the wear resistance process and whether such process is performed). Therefore, the manufacturing cost of the front roller 120A is not increased, and the overall cost of the vehicle performance test device 100 can be suppressed. However, the disclosure does not intend to limit whether the electrodeposition particle layer 124 is only formed on the surface S of the rear roller 120B (i.e., the disclosure does not intend to limit whether the electrodeposition particle layer 124 is formed on the surface S of the front roller 120A). Such detail may be chosen as needed.

In view of the foregoing, in the vehicle performance test device according to the disclosure, the front roller and the rear roller are disposed in pair on the test bed and spaced apart in the vehicle front-rear direction to support the wheel of the vehicle. The wheel of the vehicle is placed between the front roller and the rear roller to test the braking performance of the vehicle. In addition, the electrodeposition particle layer is formed on the surface of the rear roller by electrodepositing rigid particles on the metal plating layer. It may be configured that, in the electrodeposition particle layer, at least a portion of the rigid particles is exposed from the surface. In this way, wear resistance is facilitated by forming the electrodeposition particle layer on the surface of the rear roller. As the electrodeposition particle layer is hardly peeled off from the surface of the rear roller, it is not required to repetitively perform a wear resistance process on the rear roller or replace the rear roller. Thus, the testing cost can be reduced. Thus, in the vehicle performance test device according to the disclosure, the rear resistance of the rear roller can be facilitated. As a result, the testing cost is reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle performance test device, comprising:
   a test bed, configured to support a vehicle; and
   a front roller and a rear roller, disposed in pair on the test bed and spaced apart in a vehicle front-rear direction to support a wheel of the vehicle,
   wherein the wheel of the vehicle is placed between the front roller and the rear roller to test braking performance of the vehicle, and
   an electrodeposition particle layer is formed on a surface of the rear roller by electrodepositing rigid particles on a metal plating layer.

2. The vehicle performance test device as claimed in claim 1,
   wherein the electrodeposition particle layer is configured to expose at least a portion of the rigid particles from a surface.

3. The vehicle performance test device as claimed in claim 2,
   wherein the electrodeposition particle layer is not formed on a surface of the front roller.

4. The vehicle performance test device as claimed in claim 1,
   wherein the electrodeposition particle layer is not formed on a surface of the front roller.

* * * * *